Aug. 8, 1950           R. POLLOCK           2,518,061
VIBRATOR-OPERATED ELECTRIC POWER CONVERTING APPARATUS
Filed April 21, 1947
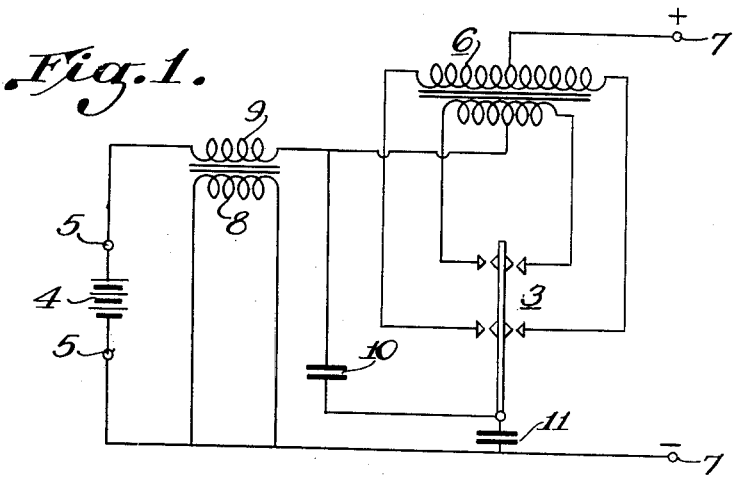
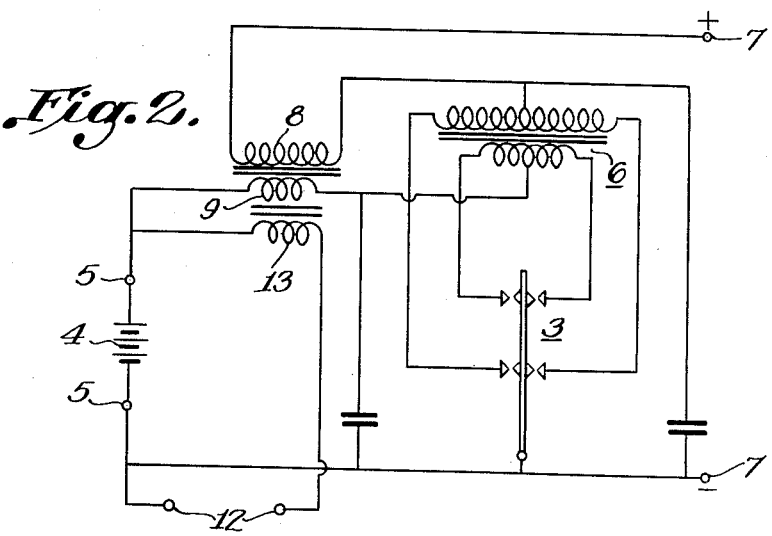
Inventor,
ROBERT POLLOCK.
Eugene E. Stevens
By. Attorney.

Patented Aug. 8, 1950

2,518,061

UNITED STATES PATENT OFFICE 2,518,061

VIBRATOR-OPERATED ELECTRIC POWER CONVERTING APPARATUS

Robert Pollock, North Wembley, England, assignor to Masteradio Limited, Watford, England, a British company Application April 21, 1947, Serial No. 742,811
In Great Britain March 24, 1941

Section 1, Public Law 690, August 8, 1946
Patent expires March 24, 1961

3 Claims. (Cl. 321—48)

This invention relates to electric power converting apparatus of the vibratory type and is particularly, but not exclusively, concerned with apparatus of this type which is suitable for energising electric wave-sensitive devices or equipment, for example radio receivers.

In general this type of converter comprises a vibratory device, such as a steel reed, adapted to be maintained in vibration by electromagnetic or other means to execute a cyclic switching operation. The electrical system comprises a primary circuit and a secondary or output circuit and quite often, though not essentially, a subsidiary circuit, for example a circuit connected in parallel with said primary circuit.

Due to the abrupt nature of the changes produced by the cyclic opening and closing of the switching contacts it has been necessary to provide a considerable degree of smoothing in order to obtain an output suitable for energising a radio receiver, whilst moreover the particularly steep pulses of current have often contained harmonic frequencies lying within the tuning range of the receiver. In cases where a subsidiary circuit is included this circuit also has been subject to disturbance by the cyclic switching operation, such disturbance including a pronounced voltage ripple.

Now it is the object of this invention to minimise the above disadvantages and with this object in view the invention provides means in association with an apparatus of the type set forth whereby electric impulses which are developed in one circuit as a result of the operation of the vibratory switching means, are injected into another circuit with such sense as to oppose the development of corresponding impulses in said other circuit.

Thus in general the deleterious effect in a secondary circuit of the abrupt changes of current in a primary circuit are reduced by injecting corresponding but antiphase impulses into the secondary circuit.

The injection of the impulses preferably is effected inductively, for example by means of a transformer device having one of its windings included in the primary circuit and another winding, or possibly a part of a common winding, in each circuit adapted to receive the injection.

According to one embodiment of the invention a choke coil winding is employed in each of the two leads to the primary circuit and these two windings are mounted with desired mutual coupling, for example by being arranged upon a common magnetic core to constitute in effect a transformer device. One of these choke windings is also serially included in a secondary circuit and the arrangement is such that electric impulses occurring in the other winding are injected into the secondary circuit in a manner which tends to oppose the formation of corresponding impulses therein. In this way the wave form of the current pulsations appearing in the secondary circuit is appreciably improved thus enabling efficient smoothing more readily to be effected.

By employing condensers in appropriate positions, for example across the windings or as a coupling between the windings, a certain amount of control can be obtained over the relationship existing between said windings. Thus the arrangement can be made to provide attenuation of interfering impulses of a particular frequency or wave formation.

To enable the invention better to be understood two examples thereof will now be more particularly described with reference to the accompanying drawings wherein Figure 1 shows a schematic circuit diagram of one embodiment of vibratory converter incorporating the invention, and Figure 2 shows, in similar manner, a modified embodiment.

In the arrangement shown in Figure 1 there is provided a vibratory switching means 3 adapted to be energised by a low voltage direct current source, such as an accumulator battery 4, connected to input terminals 5—5. This switching device is of the so-called self-rectifying type and is connected with the windings of a voltage step-up transformer 6 in order to deliver high tension direct current to the output terminals 7—7. Thus the opposite ends of the primary winding are connected to fixed contacts of the switching means, the vibratory member of which serves to connect said contacts alternately with one pole of the battery 4 through a choke coil winding 8. The primary winding is centre tapped and this tapping is connected through another choke coil winding 9 to the other pole of the battery 4. The opposite ends of the secondary winding of the transformer are connected to other fixed contacts of the switching means and a centre tapping of this secondary is connected to the "positive" output terminal 7. The "negative" output terminal is connected to the input end of the choke coil winding 8 and is preferably "earthed."

It will be observed that the choke coil winding 8 is serially included in the high tension circuit. Consequently by providing an appropriate mutual coupling between the two choke coil windings, electric impulses developed in the winding 9 as a result of the operation of the switching means 3, beneficially can be introduced into the high tension circuit and there bring about a general smoothing of the high tension current. Conveniently the windings 8 and 9 can be mounted upon a common magnetic core.

The arrangement shown also includes condensers 10 and 11 having for effect to eliminate interference which may otherwise be radiated from the leads extending to the battery 4. These condensers can be made to exercise a certain amount of control over the relation between the windings 8 and 9 so that the phase relationship of the ripple currents in the primary and secondary circuits can be adjusted to obtain optimum smoothing.

In the modification shown in Figure 2 similar references are applied to corresponding elements. It will be observed that in this case only one choke coil winding is included in the low tension circuit. Consequently it is practicable to employ a much higher turns ratio for the windings 8 and 9 so as to obtain an advantageous voltage step-up for the impulses transferred from the low tension circuit to the high tension circuit. The fact that this arrangement enables the vibratory member of the switching device directly to be "earthed" with the "negative" output terminal is also an advantage.

Where a subsidiary circuit is included in the system, for example a valve heater circuit adapted to be energized by the same low voltage supply source, impulse injecting means may be provided for this subsidiary circuit. Thus, in Figure 2 a subsidiary circuit connected across the battery 4 and having output terminals 12—12, also includes a winding 13 arranged to have desired mutual coupling with the winding 9. In this way a substantial reduction of switching interference in the subsidiary circuit can be made.

Apparatus according to the present invention can with advantage incorporate spark suppression means such as those described in the specification of our co-pending United Kingdom patent application No. 3,971/41 (Serial No. 547,834), U. S. Serial No. 742,812, filed April 21, 1947.

It is to be understood that the invention is not limited to the precise forms and details of construction described as these may be varied to suit particular cases without departing from the scope of the appended claims.

I claim:

1. Electric power converting apparatus of the vibratory type including a primary circuit and a secondary circuit and means whereby electric impulses which are developed in the primary circuit as the result of the operation of the vibratory switching means are injected into the secondary circuit in such a manner as to oppose the development of corresponding impulses in said secondary circuit and comprising input terminals for connecting the primary circuit to a low voltage source, a vibratory switching means of the self-rectifying type, a step-up transformer, connections between the opposite ends of the primary of said transformer and fixed contacts of the switching means, connections between the opposite ends of the secondary of the transformer and other fixed contacts of the switching means, and a connection between one input terminal and a tapping on the said primary winding, said latter connection including a choke coil winding which is inductively coupled to a winding which is included in the output circuit of the apparatus.

2. Apparatus according to claim 1 wherein the vibratory contacts of the switching means are connected to the other input terminal through a winding which is inductively coupled to the said choke coil winding for the purpose set forth.

3. Apparatus according to claim 1 wherein a tapping on the secondary of the transformer is connected to an output terminal through a winding which is inductively coupled to said choke coil winding.

ROBERT POLLOCK.

REFERENCES CITED

The following references are of record in the file of this patent:

UNITED STATES PATENTS

| Number | Name | Date |
| --- | --- | --- |
| 2,140,094 | Sullivan | Dec. 13, 1938 |
| 2,148,193 | Dressel | Feb. 21, 1939 |